United States Patent
Wang et al.

[11] Patent Number: 5,854,374
[45] Date of Patent: Dec. 29, 1998

[54] PHOSPHONIUM BOROHYDRIDE COMPOUND AND PROCESS FOR PRODUCING POLYCARBONATE USING SAID COMPOUND

[75] Inventors: Chun-Shan Wang; Jen-Tau Gu, both of Tainan, Taiwan

[73] Assignee: National Science Council, Taiwan

[21] Appl. No.: 882,588

[22] Filed: Jun. 25, 1997

[30] Foreign Application Priority Data

May 20, 1997 [TW] Taiwan ................................ 86106767

[51] Int. Cl.$^6$ .................................................. C08G 64/00
[52] U.S. Cl. .......................... 528/196; 528/198; 558/268
[58] Field of Search ..................... 528/196, 198; 558/268

[56] References Cited

U.S. PATENT DOCUMENTS

| | | | |
|---|---|---|---|
| 5,221,761 | 6/1993 | Jen ........................................... | 558/268 |
| 5,432,250 | 7/1995 | Yamato et al. .......................... | 528/196 |

FOREIGN PATENT DOCUMENTS

| | | |
|---|---|---|
| 0 351 168 A2 | 7/1989 | European Pat. Off. . |
| 0 382 250 A2 | 2/1990 | European Pat. Off. . |
| 0 608 778 A2 | 1/1994 | European Pat. Off. . |

*Primary Examiner*—Terressa Mosley
*Attorney, Agent, or Firm*—Fish & Richardson P.C.

[57] ABSTRACT

A process for producing a polycarbonate including melt polycondensing an aromatic dihydroxy compound and a carbonic acid diester in the presence of a phosphonium borohydride catalyst(I),

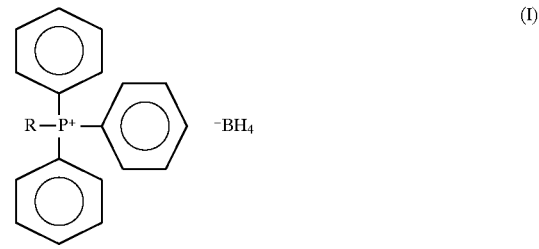

wherein R is a straight-chain or branched alkyl group, or

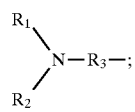

wherein each of $R_1$, $R_2$, and $R_3$, independently is a $C_1$~$C_4$ alkyl group. A colorless, transparent polycarbonate having a high molecular weight is obtained by using the phosphonium borohydride compound (I) as a transesterification catalyst, which may be used alone or incorporated with boric acid or a hindered phenol antioxidant.

23 Claims, No Drawings

PHOSPHONIUM BOROHYDRIDE COMPOUND AND PROCESS FOR PRODUCING POLYCARBONATE USING SAID COMPOUND

BACKGROUND OF THE INVENTION

1. Field of the Invention

The present invention relates to a phosphonium borohydride compound and a process for producing a polycarbonate (PC) by melt polycondensation through transesterification (a non-phosgene process). More particularly, the present invention relates to a process for producing a polycarbonate by melt condensation using said phosphonium borohydride compound as a transesterification catalyst.

2. Description of the Related Arts

The use of polycarbonates has grown over other engineering plastics in recent years. With the rapid growth of compact disc and CD-ROM manufacturing, it is believed that the demand for polycarbonates will continuously grow. The industrial processes for producing a polycarbonate are mainly:

(1) phosgene process(interfacial polycondesation process)
(2) non-phosgene process (melt transesterification process)

The phosgene process is the main stream for producing polycarbonates at present. The produced polycarbonate is transparent and has superior qualities. The phosgene process is performed according to the following reaction:

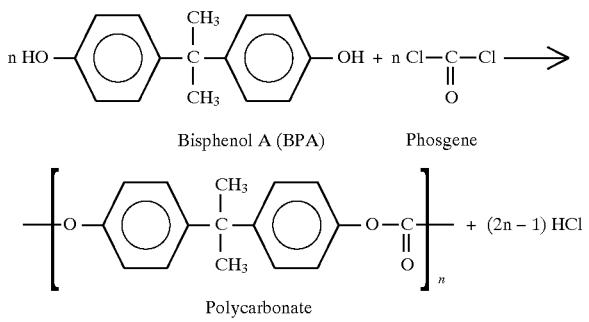

Bisphenol A (BPA)    Phosgene

Polycarbonate

In the presence of an acid binder and solvent, bisphenol A(BPA) are reacted with phosgene. In general, the acid binder is an alkaline aqueous solution such as caustic soda, and the solvent is dichloromethane. When a phosgene process is employed for producing a polycarbonate, the phosgene amount, the addition rate of phosgene, the reaction temperature, the base and solvent amount, and the agitation must be precisely controlled. The advantages of such process are summarized as below:

1. Production of a wide range of molecular weights of all grades of polycarbonates is possible.
2. Continuous operation for large-scale production is possible.
3. A lower reaction temperature reduces the energy consumption.

However, the phosgene process has its drawbacks:
1. Phosgene is highly toxic.
2. A superior separating technique is required for removing the impurities and salts produced in the reaction.
3. Residual sodium chloride and dichloromethane adversely affect the physical properties of the products.
4. Additional facilities are required for the recovery of dichloromethane
5. Dichloromethane is easily decomposed to generate hydrogen chloride which tends to corrode the equipment.
6. The products cannot be pelletized directly until they are subjected to drying, and melting.

Currently, since environment protection is gaining a world-wide attention, the phosgene process is likely to be opposed, and so a non-phosgene process will be utilized.

As for melt polycondensation process, it is performed by subjecting bisphenol A and diphenyl carbonate (DPC) to transesterification at molten state, and removing phenol byproduct thereof to polymerize the reactants to a polycarbonate. The melt polycondensation process is performed according to the following reaction:

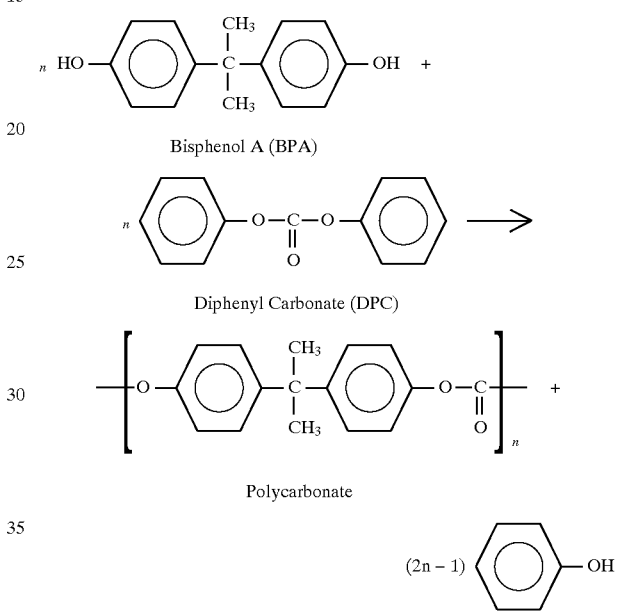

Bisphenol A (BPA)

Diphenyl Carbonate (DPC)

Polycarbonate

At the moment, it is very difficult to obtain a absolutely colorless, transparent polycarbonate by the transesterification process. The product is generally yellowish. When a melt polycondensation process is employed for producing a polycarbonate, a specific catalyst, a very good vacuum and a precise control of reaction temperature are necessary. The advantages of such process are summarized as below:

1. The use of toxic phosgene is eliminated.
2. The product can be subjected to pelletization directly.
3. The facility required is simpler.
4. No solvent is necessary, thus sparing the complicated solvent recovery system.

The drawbacks of the transesterification process are:
1. More energy is consumed since the reaction is performed at a high temperature.
2. A powerful agitating device is required since the viscosity of the reaction mixture is very high when polycondensation approaches completion.
3. The resulted polycarbonate is agitated at a high temperature for a long period of time, which may color the reaction product.
4. The complete removal of phenol byproduct is difficult which makes it difficult to obtain a high-molecular-weight polycarbonate.

Even without the presence of catalyst, the reaction still proceeds slowly at a temperature of 280° C. The reaction temperature is usually within the range of about 180°~350°

C. If the reaction temperature is under 200° C., it will be difficult to distill off phenol, and consequently a low-molecular-weight polycarbonate will be produced. On the contrary, if the reaction temperature is above 320° C., a coloring side reaction, or even degradation, will take place.

The non-phosgene process includes a first stage of transesterification which is usually performed at a low temperature under a low degree of vacuum (200 mmHg or above) to produce an oligomer (usually is monophenyl carbonate) with a higher boiling point, thus preventing the low-boiling diphenyl carbonate from being distilled off. Thereafter, the reaction temperature is raised and the phenol is distilled off at a high vacuum to obtain a high-molecular-weight polycarbonate.

Theoretically, in order to form a high-molecular-weight polycarbonate, the amounts of hydroxyl groups of bisphenol A and ester groups of diphenyl carbonate should be retained equal. However, considering that diphenyl carbonate is more volatile than bisphenol A, diphenyl carbonate is employed in an excess amount to lower the content of terminal hydroxyl groups of polycarbonate and render the resulted polycarbonate superior physical properties. In general, the ratio of diphenyl carbonate to bisphenol A is preferably within the range of about 1~1.15.

The use of an alkaline catalyst is preferred in a transesterification reaction, usually in an amount of $10^{-5} \sim 10^{-2}$ mole per mole of bisphenol A. Any greater amount will cause the coloring of the product or result in decreased transparency of the product, whereas any lesser amount will be unable to attain the desired high molecular weight.

One problem with the non-phosgene process is that the product has a yellowish tint. At the moment, the mechanism by which the product gains this color is not clear, but possibly due to:

1. The residual phenol or oligomers contaminate the formed polycarbonate.
2. The benzophenone or benzoate ester derivatives contained in the diphenyl carbonate, as shown below, cause the coloring of the product (see European Patent EP 584801A2).

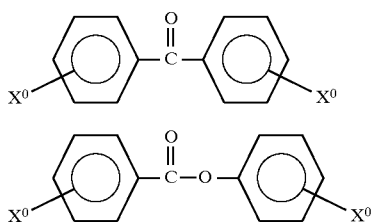

wherein $X^0$ is —Cl or —OH.

3. The use of the strong alkaline catalyst causes the coloring of the product, which is supported by the fact that bisphenol A undergoes thermal degradation at a temperature above 150° C. in the presence of a strong base, and the isopropenyl phenol and phenol thus produced subsequently undergo polymerization or addition reaction before they are distilled off, and accordingly form the coloring substances.

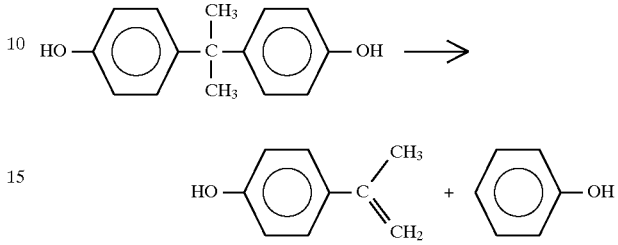

In addition, when an alkaline catalyst is present in a polycarbonate, a side reaction similar to the Kolbe-Schmitt reaction occurs, during which the carbonate group in the main chain of polycarbonate will dissociate into a carboxyl group and undergo esterification to form a side chain or a cross-linking by reacting with a terminal hydroxyl or carbonate group.

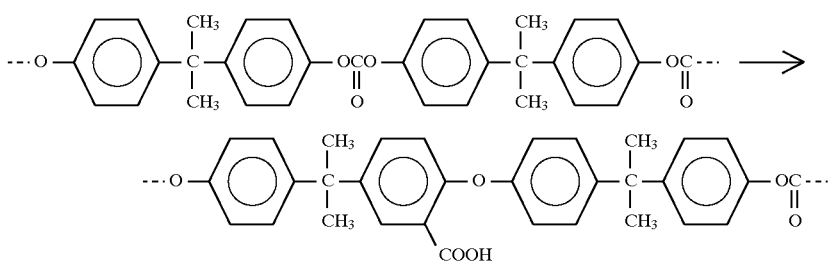

In summary, in order to prepare a polycarbonate having superior characteristics, high purity of starting materials, bisphenol A and diphenyl carbonate, and a specific catalyst are necessary to avoid the coloring side reaction.

Patents with regard to catalysts for producing a polycarbonate by melt polycondensation are innumerable, for example, U.S. Pat. No. 5,221,761(1993), European Patent EP 584801 A2(1993), and EP 559953 A2(1993), German Patent DE 431239(1994), Japanese Patent JP 7-03003 (1995), JP 6-1098899(1994), JP 3-174443(1991), and so on. Before 1990, the catalysts used in melt polycondensation are the catalysts generally used in esterification or transesterification, and conventionally are:

1. Oxide, hydroxide, or hydroborate of alkali metal (or alkaline earth metal) and alkali metal (or alkaline earth metal) salts of organic or inorganic acid, for example, CaO, MgO, NaOH, KOH, Mg(OH)$_2$, Ca(OH)$_2$, NaBH$_4$, KBH$_4$, NaBPh$_4$, CH$_3$COONa, CH$_3$COOK, Na$_2$CO$_3$, K$_2$CO$_3$, NaHCO$_3$, NaH$_2$PO$_4$, and so on;
2. Sodium(or potassium) salts of phenol or bisphenol A;
3. (CH$_3$COO)$_2$Zn, (CH$_3$COO)$_4$Pb, Sb$_2$O$_3$, Ti(OBu)$_4$, and Bu$_3$SnO$_3$; or
4. Organophosphorous compounds.

Although the above-mentioned catalysts can produce a high-molecular-weight polycarbonate, they are still subject to the problem of the coloring of the product.

After 1990, the catalysts used in melt polycondensation are not limited to esterification catalysts, and they primarily include:

1. Nitrogen-containing basic catalysts: Important catalysts are 4-dimethylaminopyridine and 2-methylimidazol. It has been claimed that they are capable of producing a colorless, high-molecular-weight polycarbonate. Catalysts of this type further include tetraalkylammonium hydroxide, which is frequently quoted in G.E Patents. For example, Me$_4$NOH can be used in combination with NaOH and H$_3$BO$_3$. This type of catalyst could be what they use in the non-phosgene process of Japanese plant.

2. Phosphorus-containing basic catalysts: Important catalysts are triphenylphosphine, triphenylphosphite, triphenylphosphate, and triphenylphosphine oxide.

SUMMARY OF THE INVENTION

It is therefore an object of the invention to provide a phosphonium borohydride compound, which may be used as a catalyst of the process for producing a polycarbonate.

It is another object of the invention to provide a process for producing a colorless, high-molecular-weight polycarbonate in the presence of a novel catalyst synthesized by the inventors.

According to an aspect of the invention, the polycarbonate produced by using the phosphonium borohydride catalyst has a higher transparency and a lower Hue value than that using the conventional esterification catalysts, and even better than using a nitrogen-containing catalyst, the best catalyst known in the present.

The above object is attained by providing a process for producing a polycarbonate, which involves melt polycondensing an aromatic dihydroxy compound and a carbonic acid diester in the presence of a phosphonium borohydride catalyst represented by the following general formula (I):

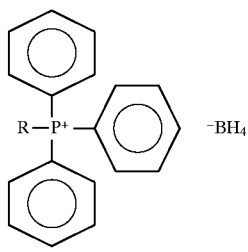
(I)

Optionally, boric acid or hindered phenol antioxidant may be added to the reaction if necessary.

The present invention will now be described in more detail.

DETAILED DESCRIPTION OF THE INVENTION

At the outset, the starting compounds for the reaction will be described.

The dihydroxy compound used in the invention is represented by the following general formula (II):

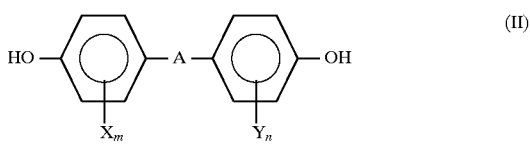

wherein A is selected from the group consisting of a straight-chain, branched, or cyclic C$_1$~C$_{15}$ alkyl group, —O—, —S—, —C(O)—, —S(O)—, and —S(O)$_2$—; each of X and Y, independently is hydrogen, halogen, or C$_1$~C$_6$ alkyl; and each of m and n, independently is an integer from 1 to 2. Examples of dihydroxy compounds as used herein include but are not limited to bis(4-hydroxyphenyl)methane, 1,1-bis (4-hydroxyphenyl)ethane, 2,2-bis(4-hydroxyphenyl) propane (Bisphenol A), 2,2-bis(4-hydroxyphenyl)butane, 2,2-bis(3,5-dibromo-4-hydroxyphenyl)propane, and 1,1-bis (4-hydroxphenyl)cyclohexane, preferably Bisphenol A. A mixture of the above is also suitable for use.

The carbonic acid diester used in the invention is represented by the following general formula (III):

wherein each of Ar$^a$ and Ar$^b$, independently is a monovalent aliphatic or an aromatic group. Examples of carbonic acid diester as used herein include but are not limited to diphenyl carbonate, substituted diphenyl carbonate, ditolyl carbonate, dimethyl carbonate, and dicyclohexyl carbonate, preferably substituted diphenyl carbonate. A mixture of the above is also suitable for use.

The carbonic acid diester is generally used in an amount of about 1.01~1.3 mol, preferably 1.02~1.20 mol per mole of the aromatic dihydroxy compound.

The transesterification catalyst to be used in the invention is represented by the following general formula (I):

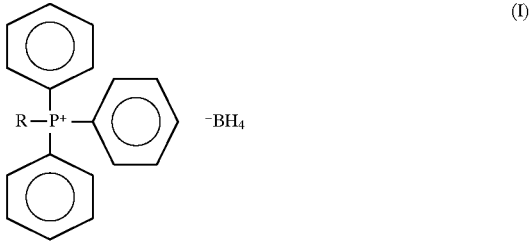

wherein R is a straight-chain or branched alkyl group, or

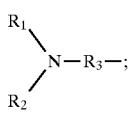

wherein each of R$_1$, R$_2$, and R$_3$, independently is a C$_1$~C$_4$ alkyl group. Examples of dihydroxy compounds as used herein include but are not limited to ethyltriphenyl phosphonium borohydride, n-propyltriphenyl phosphonium borohyride, n-butyltriphenyl phosphonium borohydride, (dimethylaminoethyl)triphenyl phosphonium borohydride, and (diethylaminoethyl)triphenyl phosphonium borohydride, preferably ethyltriphenyl phosphonium borohydride and (dimethylaminoethyl)triphenyl phosphonium borohydride.

The phosphonium borohydride catalyst is generally used in an amount of about 10$^{-6}$ to 10$^{-2}$ mole, preferably 10$^{-5}$ to 10$^{-3}$ mol per mole of the aromatic dihydroxy compound.

The above-described quaternary phosphonium catalyst may be used alone or in combination with boric acid. The boric acid is generally used in an amount of about $10^{-6}$ to $10^{-4}$ mole per mole of the aromatic dihydroxy compound. If necessary, a hindered phenol antioxidant such as Irgaphos PEPQ, may be added to the reaction, preferably in an amount of about 0.05 wt. % per mole of the aromatic dihydroxy compound. Irgaphos PEPQ is as shown below:

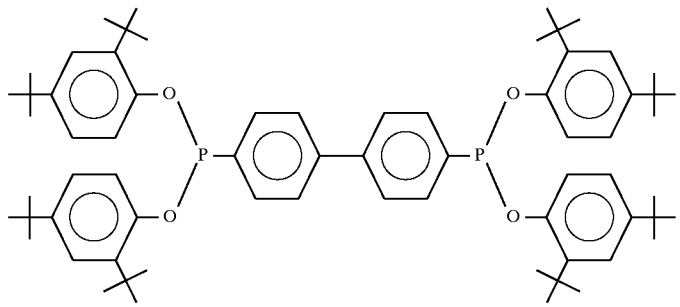

In the present invention, the process for producing a polycarbonate includes subjecting the above-mentioned starting compounds to transesterification under ordinary or reduced pressure and melt polycondensation while distilling off by-products produced in the reaction. In general, the first step is transesterification, which is performed at a temperature of about 120°~260° C. for about 0.5~5 hours, preferably at about 180°~240° C. for about 1~3 hours. Thereafter, the system is gradually evacuated to a degree of vacuum of about 2 mmHg and the reaction temperature is gradually elevated to about 250°~320° C., preferably about 280°~320° C. The above-described reaction may be performed either batchwise or continuously, and the reaction apparatus may be a vessel-type, a vertical-type or a horizontal-type agitating apparatus.

The invention is described in greater detail with reference to the following non-limiting examples.

PREPARATIVE EXAMPLE 1

At first, the method of synthesizing a phosphonium borohydride catalyst used herein will be described.

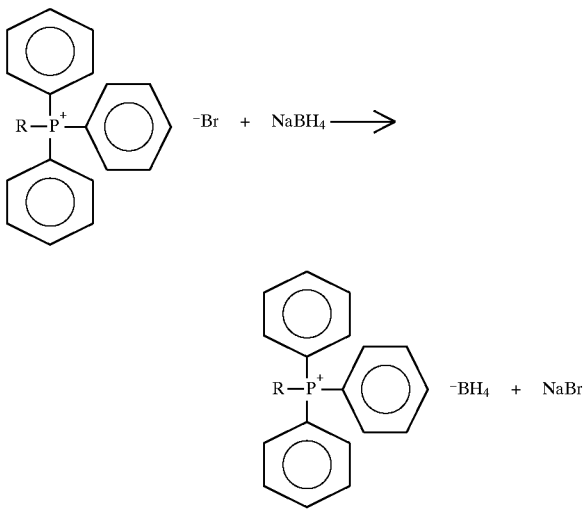

To 7.43 g (20 mmol) of ethyltriphenyl phosphonium bromide dissolved in 25 ml of water, 10 ml of sodium borohydride (0.757 g, 20 mmol) aqueous solution was added. The mixture was stirred at room temperature for 2 hours, and then extracted with 100 ml of dichloromethane twice. The combined dichloromethane extracts were concentrated to yield 5.57 g of ethyltriphenyl phosphonium borohydride as white powder (91% yield, Catalyst A).

PREPARATIVE EXAMPLE 2

To 8.29 g (20 mmol) of (2-dimethylaminoethyl)triphenyl phosphonium bromide dissolved in 25 ml of water, 10 ml of sodium borohydride (0.757 g, 20 mmol) aqueous solution was added. The mixture was stirred at room temperature for 2 hours, and then extracted with 100 ml of dichloromethane twice. The combined dichloromethane extracts were concentrated to yield 6.42 g of (2-dimethylaminoethyl)triphenyl phosphonium borohydride as white powder (92% yield, Catalyst B).

The produced Catalyst A and Catalyst B were used for producing a polycarbonate as illustrated in Examples 1~4. The Comparative Examples 1~2 illustrate the conventional process for producing a polycarbonate. The physical properties of the polycarbonates produced in Examples 1~4 and the Comparative Example 1~2 were measured and shown in Table 1. The methods of measuring of physical properties are described below.

(1) inherent viscosity $[\eta]$

In a conical flask was placed precisely 0.0027~0.103 g of a polycarbonate and 25 ml of dichloromethane was added to completely dissolve the polycarbonate. The inherent viscosity $[\eta]$ was measured set at 20°±0.02° C. using a Ubbelohde's viscometer and the result was calculated according to the Billmeyer Equation:

$$[\eta]=\tfrac{1}{4}[\eta_{sp}+3 \ln \eta_r]$$

wherein $\eta_r=t/t_0$, $\eta_{sp}=\eta_r-1$;

c: solution concentration(g/100 ml);

$t_0$: flow time of the solvent;

t: flow time of the solution;

(2) Glass transition temperature (Tg)

The glass transition temperature was obtained from 5~15 mg samples in a nitrogen atmosphere with the use of differential scanning calorimeter (DSC) while elevating the temperature from room temperature to 250° C. at a rate of 20° C./min.

(3) Transparency

The transparency was measured with the dichloromethane solution of 10% polycarbonate at wavelength of 470 nm. The higher the transparency, the superior the clarity.

(4) Hue (b value)

The polycarbonate was dissolved in dichloromethane at a concentration of 4 g/per 100 ml and measured for absorbance at a fixed wavelength of 345 nm. Because the absorbance of a polycarbonate at 345 nm is proportional to the measured b value of the test specimen by injection molding, so the absorbance is taken as an index of the b value of a polycarbonate. The lower the b value, less color the polycarbonate is.

EXAMPLE 1

Into a five-neck reactor equipped with a nitrogen inlet, a stirring rod, a sampling opening, a condenser and a temperature control device, 228 g (1.0 mol) of bisphenyl A, 220 g (1.025 mol) of diphenol carbonate, 0.075 g ($2.5 \times 10^{-4}$ mol) of ethyltriphenyl phosphonium borohydride (Catalyst A of the Preparative Example 1) and 0.114 g (0.05 wt. % per mol of bisphenol A) of Irgaphos PEPQ were charged. Thereafter, the reaction system was evacuated to about 2 mmHg, and then purged with nitrogen. This purging procedure was repeated three times to insure that all the air in the reactor was expelled. Under nitrogen atmosphere, the temperature was then raised to 140° C. to dissolve the reactants, and then to 180° C. in order to subject the reactants to transesterification. The transesterification was performed for 1 hour and part of the phenol by-product was distilled during this period.

Subsequently, the reaction temperature was gradually raised from 180° C. to 210° C. while the pressure was also gradually reduced to 200 mmHg, and stirring was continued under these conditions for 30 minutes. Thereafter, the temperature was raised to 240° C. while gradually reducing the pressure to 15 mmHg, and the reaction was continued under these conditions for 30 minutes. Then, the temperature was raised to 280°±5° C. and the reaction system was evacuated to 1 mmHg, and the reaction was continued under these conditions for 1~2 hours.

Subsequently, the system was restored to atmospheric pressure with nitrogen, and the polycarbonate product was taken out before being cooled. Physical properties of the polycarbonate were measured using the polycarbonate power and the results are shown in Table 1.

EXAMPLE 2

The same procedure as in the Example 1 was repeated, but additionally 0.016 g ($2.5 \times 10^{-4}$ mol) of boric acid was added. The physical properties of the polycarbonate thus obtained were measured and are shown in Table 1.

EXAMPLE 3

The same procedure as in the Example 1 was repeated, expect that 0.0873 g ($2.5 \times 10^4$ mol) of (2-dimethylaminoethyl) triphenyl phosphonium borohydride (Catalyst B) was used instead of ethyltriphenyl phosphonium borohydride (Catalyst A). The physical properties of the polycarbonate thus obtained were measured and are shown in Table 1.

EXAMPLE 4

The same procedure as in the Example 3 was repeated, but additionally 0.016 g ($2.5 \times 10^4$ mol) of boric acid was added. The physical properties of the polycarbonate thus obtained were measured and are shown in Table 1.

Comparative Example 1

The same procedure as in the Example 1 was repeated, except that ethyltriphenyl phosphonium borohydride (Catalyst A) was replaced by the catalyst according to Japan Kokai Tokkyo Koho JP 5-17564 (to G. E. Plastics). The catalyst according to Japan Kokai Tokkyo Koho JP 5-17564 is a combination of tetramethyl ammonium hydroxide ($1.0 \times 10^{-4}$ mol per mole of bisphenol A) and sodium hydroxide ($2.0 \times 10^{-7}$ mole per mole of bisphenol A). The physical properties of the polycarbonate thus obtained were measured and are shown in Table 1.

Comparative Example 2

The same procedure as in the Example 1 was repeated, except that ethyltriphenyl phosphonium borohydride (Catalyst A) was replaced by 4-dimethylaminopyridine in an amount of $1.0 \times 10^{-4}$ mol per mole of bisphenol A (according to Japan Kokai Tokkyo Koho JP 3-149221, to Daciel). The physical properties of the polycarbonate thus obtained were measured and are shown in Table 1.

TABLE 1

| | Limiting viscosity | Tg (°C.) | Transparency (%) | uv 345 nm |
|---|---|---|---|---|
| Example 1 | 0.2884 | 145.2 | 94.5 | 0.292 |
| Example 2 | 0.3091 | 148.3 | 92.3 | 0.315 |
| Example 3 | 0.2954 | 146.6 | 98.6 | 0.268 |
| Example 4 | 0.3172 | 147.7 | 93.5 | 0.307 |
| Comp.Example 1 | 0.3089 | 147.8 | 78.5 | 0.487 |
| Comp.Example 2 | 0.3068 | 146.3 | 76.2 | 0.510 |

It is seen from Table 1 that the polycarbonate produced by using the catalyst of the invention is superior in both transparency and hue to that produced by using the conventional catalysts.

What is claimed is:

1. A process for producing a polycarbonate comprising melt polycondensing an aromatic dihydroxy compound and a carbonic acid diester in the presence of a transesterification catalyst, said process being characterized by the employment of a phosphonium borohydride catalyst of formula (I):

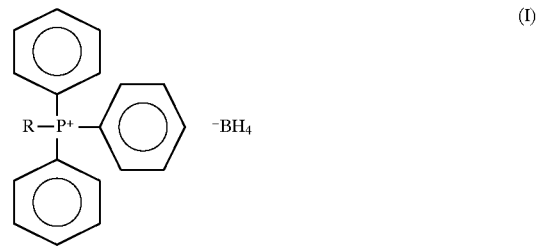

(I)

wherein R is a straight-chain or branched alkyl group, or

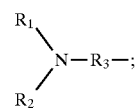

wherein each of $R_1$, $R_2$, and $R_3$, independently is a $C_1$~$C_4$ alkyl group.

2. The process for producing a polycarbonate as claimed in claim 1, wherein the carbonic acid diester is used in an amount of about 1.01 to 1.3 mole per mole of the aromatic dihydroxy compound.

3. The process for producing a polycarbonate as claimed in claim 1, wherein the phosphonium borohydride catalyst is present in an amount of about $10^{-6}$ to $10^{-2}$ mole per mole of the aromatic dihydroxy compound.

4. The process for producing a polycarbonate as claimed in claim 3, wherein the phosphonium borohydride catalyst is present in an amount of about $10^{-5}$ to $10^{-3}$ mole per mole of the aromatic dihydroxy compound.

5. The process for producing a polycarbonate as claimed in claim 1, wherein the phosphonium borohydride catalyst is selected from the group consisting of ethyltriphenyl phosphonium borohydride, n-propyltriphenyl phosphonium borohyride, n-butyltriphenyl phosphonium borohydride, (dimethylaminoethyl)triphenyl phosphonium borohydride, and (diethylaminoethyl)triphenyl phosphonium borohydride.

6. The process for producing a polycarbonate as claimed in claim 1, wherein the phosphonium borohydride catalyst is ethyltriphenyl phosphonium borohydride.

7. The process for producing a polycarbonate as claimed in claim 1, wherein the phosphonium borohydride catalyst is (dimethylaminoethyl)triphenyl phosphonium borohydride.

8. The process for producing a polycarbonate as claimed in claim 1, wherein the aromatic dihydroxy compound is represented by the following general formula (II:)

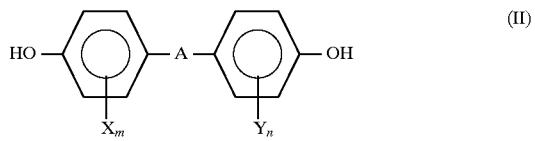

wherein A is selected from the group consisting of a straight-chain, branched, or cyclic $C_1$~$C_{15}$ alkyl group, —O—, —S—, —C(O)—, —S(O)—, and —S(O)$_2$—; each of X and Y, independently is hydrogen, halogen, or $C_1$~$C_6$ alkyl; and each of m and n, independently is an integer from 1 to 2.

9. The process for producing a polycarbonate as claimed in claim 1, wherein the aromatic dihydroxy compound is selected from the group consisting of bis(4-hydroxyphenyl)methane, 1,1-bis(4-hydroxyphenyl)ethane, 2,2-bis(4-hydroxyphenyl)propane (Bisphenol A), 2,2-bis(4-hydroxyphenyl)butane, 2,2-bis(3,5-dibromo-4-hydroxyphenyl)propane, and 1,1-bis(4-hydroxyphenyl)cyclohexane.

10. The process for producing a polycarbonate as claimed in claim 1, wherein the aromatic dihydroxy compound is Bisphenol A.

11. The process for producing a polycarbonate as claimed in claim 1, wherein the carbonic acid diester is represented by the following general formula (III):

wherein each of Ar$^a$ and Ar$^b$, independently is a monovalent aliphatic group or an aromatic group.

12. The process for producing a polycarbonate as claimed in claim 1, wherein the carbonic acid diester is selected from the group consisting of diphenyl carbonate, substituted diphenyl carbonate, ditolyl carbonate, dimethyl carbonate, and dicyclohexyl carbonate.

13. The process for producing a polycarbonate as claimed in claim 1, wherein the carbonic acid diester is diphenyl carbonate.

14. The process for producing a polycarbonate as claimed in claim 1, wherein the step of melt polycondensing comprises the following steps:

subjecting the reactants to transesterification while distilling off phenol produced in the reaction under ordinary or reduced pressure; and evacuating the reaction system and raising the reaction temperature.

15. The process for producing a polycarbonate as claimed in claim 14, wherein the transesterification is performed at a temperature of about 150°~310° C. for about 0.5~5 hours.

16. The process for producing a polycarbonate as claimed in claim 14, wherein the pressure of the reaction system is reduced to less than 2 mmHg, and the reaction temperature is raised to about 250°~320° C.

17. The process for producing a polycarbonate as claimed in claim 1, wherein melt polycondensation step is performed in the presence of about $10^{-6}$~$10^{-3}$ mole of boric acid per mole of the aromatic dihydroxy compound.

18. The process for producing a polycarbonate as claimed in claim 1 wherein the melt polycondensation step is performed in the presence of about 0.01~0.2 wt. % of a hindered phenol antioxidant per mole of the aromatic dihydroxy compound.

19. A phosphonium borohydride compound of formula (I),

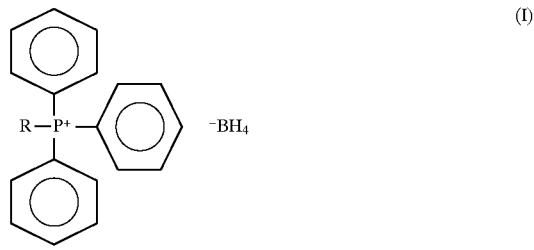

wherein R is a straight-chain or branched alkyl group, or

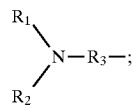

wherein each of $R_1$, $R_2$ and $R_2$, independently is a $C_1$~$C_4$ alkyl group.

20. The phosphonium borohydride compound as claimed in claim 19, which is selected from the group consisting of ethyltriphenyl phosphonium borohydride, n-propyltriphenyl phosphonium borohyride, n-butyltriphenyl phosphonium borohydride, (dimethylaminoethyl)triphenyl phosphonium borohydride, and (diethylaminoethyl)triphenyl phosphonium borohydride.

21. The phosphonium borohydride compound as claimed in claim 19, which is ethyltriphenyl phosphonium borohydride.

22. The phosphonium borohydride compound as claimed in claim 19, which is (dimethylaminoethyl)triphenyl phosphonium borohydride.

23. The phosphonium borohydride compound as claimed in claim 19, which is synthesized from triphenylphosphonium bromide and sodium borohydride.

* * * * *